UNITED STATES PATENT OFFICE.

ALMER M. McAFEE, OF PORT ARTHUR, TEXAS, ASSIGNOR TO GULF REFINING COMPANY, OF PITTSBURGH, PENNSYLVANIA, A CORPORATION OF TEXAS.

PROCESS OF PURIFYING PARAFFIN.

1,277,092.  Specification of Letters Patent.  Patented Aug. 27, 1918.

No Drawing.  Application filed June 10, 1918. Serial No. 239,291.

*To all whom it may concern:*

Be it known that I, ALMER M. McAFEE, a citizen of the United States, residing at Port Arthur, in the county of Jefferson and State of Texas, have invented certain new and useful Improvements in Processes of Purifying Paraffin, of which the following is a specification.

This invention relates to processes of purifying paraffin; and it comprises a process wherein paraffin wax is stabilized and bleached by a treatment with anhydrous aluminum chlorid, the paraffin wax, or material containing the same, being warmed to a temperature sufficient to make it fluid, a small amount of anhydrous aluminum chlorid, say 2 to 5 per cent., added, the mixture vigorously agitated, and the aluminum chlorid removed; all as more fully hereinafter set forth and as claimed.

Paraffin wax is composed of members of the paraffin series of hydrocarbons occurring in petroleum which are solid at ordinary temperatures. There are many of these hydrocarbons and they vary considerably in melting point and commerical paraffin wax may have very different points of softening and melting according to its constituents. A number of processes are in use for recovering paraffin from petroleum. Where the crude petroleum oil is distilled with use of "bottom steam" (steam led directly into the oil in the still), the latter portions of the oily distillate separate crystals of paraffin on cooling. Where a cracking distillation is used, a period of destructive distillation is resorted to after the naphtha and gasolene are distilled over, giving cracked burning oils. The residual oily material in the still which in this case is known as tar or residuum is then distilled in special stills down to a residue of coke, giving an oily distillate from which paraffin separates abundantly on cooling. Whatever the source of the paraffin-carrying oil, it is customary to cool it to a low temperature to crystallize out as much paraffin as desired and then drain or press. The crystallized paraffin so obtained is melted, re-cooled and the separating crystals once more drained or pressed and so on. As many crystallizations may be made as is necessary to obtain a product of the desired purity. In this crystallization, opportunity is afforded of course to obtain various grades of crystallized paraffin of different melting or softening points by fractional separation; that is by cooling somewhat, separating the crop of crystals formed, re-cooling and so on.

The paraffin wax thus obtained is usually purified in the usual ways adapted for treating petroleum materials, in order to decolorize it, boneblack, fullers' earth, etc., are often employed. By these purifying methods it may be obtained brilliantly white and apparently of a considerable degree of purity, but many of these white paraffins however on standing exposed to air and light develop a yellow contamination. This tendency to become yellow lowers the market grade of any paraffin considerably. The tendency to develop color is apparently not inherent in the paraffin itself but in impurities not removed by the ordinary methods of purification. Turning yellow is apparently due to a retention of more or less of the oil from which the paraffin was separated. This oil, at least in some cases, is a badly cracked material; it is largely of unsaturated nature. It is possibly because of this unsaturated nature that it tends to change on exposure to light and air; unsaturated hydrocarbons being much more reactive under such circumstances than the saturated hydrocarbons, such as paraffin.

I have found that this tendency to turn yellow on the part of the commercial paraffin wax may be simply and easily removed by melting the paraffin and agitating vigorously for a few hours, say 2 to 6 hours, with a small amount of a metallic halid such as aluminum chlorid, say 2 to 5 per cent. The temperature at which this is done should not be much higher than suffices for melting the particular paraffin wax. A temperature of 150° F. ordinarily does very well. The temperature may of course be carried up somewhat higher, say to 212° F.; but I find temperatures around 150° are better. The action of the aluminum chlorid in producing this stabilizing effect on the paraffin is of a more or less uncertain nature but I am of the opinion that it operates chiefly by converting the unsaturated oily bodies present into saturated bodies. After the aluminum chlorid has acted on the paraffin for the desired length of time, the warm mixture is allowed to stand quietly for a time with the result of the deposition of most of the aluminum chlorid. What still remains in suspension or solution may be removed by agitating with fullers' earth, treating with sulfuric acid or in various other ways. If the melted paraffin wax is treated with sulfuric acid to remove aluminum chlorid, the acid treatment may be followed by washing, treatment with alkali, etc. In one embodiment of the present invention I take ordinary paraffin wax and so treat it successively with aluminum chlorid, sulfuric acid, water and alkali, etc.

The action of the aluminum chlorid on the bodies other than paraffin present is so energetic that the operation may also be utilized in effecting further purifying actions. In other words, instead of merely taking marketable paraffin wax, which has already been purified, and submitting it to the action of aluminum chlorid, I may take the crude wax and treat it with aluminum chlorid, omitting the ordinary and customary purification methods as unnecessary. In this manner of operation, I simply take the crude wax separated from oily matters by refrigeration, etc., melt it and treat it with aluminum chlorid in the manner described.

What I claim is:—

1. The process of purifying paraffin wax which comprises warming such wax with a metallic halid at a temperature sufficient to melt the wax but insufficient to cause production of any substantial amount of volatile bodies by the action of said metallic halid.

2. The process of purifying paraffin wax which comprises warming such wax with anhydrous aluminum chlorid at a temperature sufficient to melt the wax but insufficient to cause production of any substantial amount of volatile bodies by the action of said aluminum chlorid.

3. The process of purifying paraffin wax which comprises warming such wax with anhydrous aluminum chlorid at a temperature around 150° F.

4. The process of purifying paraffin wax which comprises melting crude paraffin wax merely sufficient to produce fusion but insufficient to cause production of any substantial amount of volatile bodies by the action of said aluminum chlorid, agitating vigorously with anhydrous aluminum chlorid, allowing to stand and settle and removing residual aluminum chlorid from the settled wax.

In testimony whereof, I affix my signature.

ALMER M. McAFEE.